United States Patent [19]

Minato et al.

[11] Patent Number: 5,086,175
[45] Date of Patent: Feb. 4, 1992

[54] POLYISOCYANATES, THEIR PRODUCTION AND USES

[75] Inventors: Ichiro Minato, Kobe; Fumiaki Hirata, Sakai; Tatsuya Nakashima, Nishinomiya, all of Japan

[73] Assignee: Takeda Chemical Industries, Ltd., Osaka, Japan

[21] Appl. No.: 451,746

[22] Filed: Dec. 18, 1989

[30] Foreign Application Priority Data

Dec. 28, 1988 [JP] Japan .................. 63-330979

[51] Int. Cl.$^5$ .................. C07D 251/34; C08K 5/34
[52] U.S. Cl. .................. 544/221; 524/101
[58] Field of Search .................. 544/221

[56] References Cited

U.S. PATENT DOCUMENTS 3,487,080 12/1969 Matsui et al. .................. 260/248
3,609,149 9/1971 Matsui et al. .................. 260/248 NS
4,789,705 12/1988 Kase et al. .................. 524/590

FOREIGN PATENT DOCUMENTS 61-72013 4/1986 Japan .................. 544/221
61-129173 6/1986 Japan .................. 544/221

Primary Examiner—Johann Richter
Attorney, Agent, or Firm—Wenderoth, Lind & Ponack

[57] ABSTRACT

A polyisocyanate having an isocyanurate ring which is obtained by reacting a diisocyanate compound selected from the group consisting of alkylene, cycloalkylene and aralkylene diisocyanates with a monoalcohol of 10 to 50 carbon atoms in the presence of an isocyanuration catalyst, and removing of the unreacted diisocyanate compound from the reaction mixture, can be used in combination with various polyols, in the main, for the preparation of coatings, adhesives, architectural materials, molding materials, etc.

27 Claims, No Drawings

POLYISOCYANATES, THEIR PRODUCTION AND USES

FIELD OF THE INVENTION

The present invention relates to a polyisocyanate having an isocyanurate ring which is sparingly toxic, well-compatible with other resins, and excellent in workability and weatherability, their production and uses. This polyisocyanate is very useful for industrial applications such as coatings, adhesives, architectural materials and molding materials.

BACKGROUND OF THE INVENTION

Among the known curing components for use in the production of polyurethane resins having useful mechanical properties, e.g. wear resistance, and chemical properties, polyisocyanates derived from non-yellowing diisocyanates, namely alkylene diisocyanates, cycloalkylene diisocyanates and aralkylene diisocyanates, excel in weather resistance and shelf life and particularly polyisocyanates having an isocyanurate ring, which is chemically stable, are known to be superior to the known biuret and adduct polyisocyanates in terms of weather resistance and shelf life.

Because of such desirable properties, those isocyanurate type polyisocyanates derived from alkylene diisocyanates, cycloalkylene diisocyanates, etc. are expected to be used in an ever-increasing spectrum of industrial uses. However, because of the high polarity of the isocyanurate ring, these polyisocyanates have been found to have the following disadvantages.

1) Although they are excellent in solubility, they must be used as dissolved in toxic polar solvents such as ethyl acetate, toluene, xylene, etc.

2) Despite the recent demand for high-solid coatings which has arisen from awareness of the risk of atmospheric pollution by volatile solvents, the coatings available today are still so high in viscosity that large amounts of solvents are required.

3) In respect of compatibility with other resins, the known polyisocyanates are not sufficiently compatible with fluorine-containing resins which are indicated in applications calling for high weather resistance. Thus, the isocyanurate type polyisocyanates so far proposed have met with considerable difficulties in commercial applications, because of the above problems associated with working environment, pollution and performance.

For overcoming these problems of the prior art technology, there has bene proposed a process which comprises using a diol containing 10 to 40 carbon atoms in the isocyanuration of such diisocyanates (Japanese laid-open Patent Application KOKAI No. 72013/1986) as well as a process which comprises using a polyester polyol containing 12-hydroxystearic acid as an essential component unit (Japanese laid-open Patent Application KOKAI No. 209124/1987), both processes aimed at improving the solubility of polyisocyanates in poor solvents of low polarity. However, these processes still have the following and other drawbacks and are, therefore, not fully satisfactory.

1) Though the polyisocyanates can be dissolved in poor solvents at room temperature or thereabouts, they are not soluble and produce white turbidity at low temperatures below 5° C. so that they present problems in the winter months.

2) Because of their high viscosities, these polyisocyanates must be dissolved using large amounts of poor solvents and are, therefore, cannot meet the current demand for high-solid coatings.

3) Only compounds with low NCO contents sized so that a large proportion of the isocyanate component is required to economic disadvantage.

DETAILED DESCRIPTION OF THE INVENTION

The inventors of the present invention explored the problems of the prior art technology and found that when a monoalcohol of 10 to 50 carbon atoms is employed in the isocyanuration of a diisocyanate, there is obtained a polyisocyanate which is readily soluble in poor solvents, does not produce white turbidity at low temperatures below 5° C., is so low in viscosity as to meet the demand for high-solid coatings, and has a high NCO content. The present invention has been conceived and developed on the basis of the above findings.

The present invention relates to:

1. A polyisocyanate having an isocyanurate ring which is obtained by reacting a diisocyanate compound selected from the group consisting of alkylene, cycloalkylene and aralkylene diisocyanates with a monoalcohol of 10 to 50 carbon atoms in the presence of an isocyanuration catalyst, and removing the unreacted diisocyanate compound from the reaction mixture.

2. A process for producing a polyisocyanate having an isocyanurate ring which comprises reacting a diisocyanate compound selected from the group consisting of alkylene, cycloalkylene and aralkylene diisocyanates with a monoalcohol of 10 to 50 carbon atoms in the presence of an isocyanuration catalyst, followed by removing the unreacted diisocyanate compound from the reaction mixture.

3. A process for producing a polyisocyanate having an isocyanurate ring which comprises reacting a diisocyanate compound selected from the group consisting of alkylene, cycloalkylene and aralkylene diisocyanates in the presence of an isocyanuration catalyst, followed by removing the unreacted diisocyanate compound from the reaction mixture and reacting the reaction product with a monoalcohol of 10 to 50 carbon atoms.

The alkylene diisocyanates which can be employed in the present invention include alkylene diisocyanates having 4 to 15 carbon atoms such as 1,4-tetramethylene diisocyanate, 1,6-hexamethylene diisocyanate. 2,2,4- or 2,4,4-trimethylhexamethylene diisocyanate, 2,6-diisocyanatomethyl caproate (lysine diisocyanate), and various mixtures thereof.

The cycloalkylene diisocyanates include cycloalkylene diisocyanates having 4 to 15 carbon atoms such as 1,3- or 1,4-diisocyanatocyclohexane, 1,3- or 1,4-bis-(isocyanatomethyl)-cyclohexane, 3-isocyanatomethyl-3,5,5-trimethylcyclohexyl isocyanate (isophorone diisocyanate), dicyclohexylmethane-4,4'-diisocyanate, isopropylidene-bis(4-cyclohexyl)isocyanate, etc. and various mixtures thereof.

The aralkylene diisocyanates include aralkylene diisocyanates having 4 to 15 carbon atoms such as 1,3- or 1,4-xylylene diisocyanate, tetramethylxylylene diisocyanate, 4,4,'-bis(isocyanatomethyl)-diphenylmethane, and various mixtures thereof.

Among the above-mentioned diisocyanates, 1,6-hexamethylene diisocyanate and 1,3-bis(isocyanatomethyl)-cyclohexane are particularly advantageous.

The monoalcohols containing 10 to 50 carbon atoms may be any of primary, secondary and tertiary monoalcohols. The use of a monoalcohol containing less than 10 carbon atoms leads to very low solubility in poor solvents and causes turbidity at low temperatures below 5° C.

On the other hand, if the number of carbon atoms exceeds 50, the NCO content of the product polyisocyanate will not be adequately high.

As the above-mentioned monoalcohol of 10 to 50 carbon atoms, a straight-chain or branched monoalcohol is generally employed.

The straight-chain monoalcohol may for example be n-decanol, n-undecanol, n-dodecanol (lauryl alcohol), n-tridecanol, n-tetradecanol, n-pentadecanol, n-heptadecanol, n-octadecanol (stearyl alcohol), n-nonadecanol, eicosanol, seryl alcohol, myricyl (melissyl) alcohol or the like.

The branched monoalcohol may for example be 5-ethyl-2-nonanol, trimethylnonyl alcohol, 2-hexyldecanol, 3,9-diethyl-6-tridecanol, 2-isoheptylisoundecanol, 2-octyldodecanol, 2-decyltetradecanol, 2-cetylstearyl alcohol or the like. Among the above-mentioned monoalcohols, branched monoalcohols containing 12 to 30 carbon atoms are preferred.

The monoalcohol to be employed in the present invention may contain, in addition to one hydroxyl group, such other structures as ester group, ether group, cyclohexane ring, aromatic ring, etc. unless such structural moieties will not adversely affect the weather resistance of the product polyisocyanate.

It should be noted that aliphatic unsaturated alcohols, diols, triols and the like may be present in these monoalcohols in such minor proportions as will not markedly affect the characteristics of the polyisocyanate of the invention.

The above-mentioned monoalcohol is used in such a proportion that the average number of functional groups in the product polyisocyanate will not be less than 2. Generally, the monoalcohol is used in the amount of about 0.1 to 30 percent by weight and preferably about 0.5 to 20 percent by weight based on the amount of the diisocyanate.

The isocyanuration catalyst which can be used in accordance with the present invention is preferably a hydroxyalkyl quaternary ammonium compound of the zwitterion type, such as trimethyl-N-2-hydroxypropylammonium 2-ethylhexanoate, N,N-dimethyl-N-hydroxyethyl-N-2-hydroxypropylammonium hexanoate, trimethyl-N-2-hydroxypropylammonium hexadecanoate, trimethyl-N-2-hydroxypropylammonium phenylcarbonate, trimethyl-N-2-hydroxypropylammonium formate and so on. However, the above is not an exclusive choice but any other catalyst useful for isocyanuration can be employed. The amount of the catalyst is generally about 0.001 to 0.1 percent by weight and preferably about 0.002 to 0.05 percent by weight based on the amount of the diisocanate compound. For the purpose of modulating the isocyanuration reaction, a promotor such as the organic phosphorous ester described in Japanese laid-open Patent Application KOKAI No. 129173/1986 is preferably employed.

The polyisocyanate of the present invention is obtained by the following two processes.

1) By reacting a diisocyanate compound with a monoalcohol in the presence of an isocyanuration catalyst, followed by removing the unreacted diisocyanate compound from the reaction mixture or 2) By reacting a diisocyanate compound in the presence of an isocyanuration catalyst, followed by removing the unreacted diisocyanate compound from the reaction mixture and reacting the reaction product with a monoalcohol.

The isocyanuration reaction according to the present invention is conducted generally at about 30° to 100° C. and preferably at about 40° to 80° C. The rate of conversion based on the combined charge of diisocyanate compound and monoalcohol is about 10 to 50 percent by weight and preferably about 15 to 40 percent by weight. If the conversion rate exceeds 50 percent by weight, the product polyisocyanate will have an excessively large molecular weight with decreased solubility, compatibility and NCO content and an excessively increased viscosity.

After completion of the isocyanuration reaction, the isocyanuration-catalyst is first deactivated by adding a terminating agent, such as phosphoric acid, monochloroacetic acid, dodecylbenzenesulfonic acid, p-toluenesulfonic acid or the like, to the reaction mixture and the mixture is then subjected, for example, to film evaporation for removal of the unreacted diisocyanate compound to give a polyisocyanate.

The reaction between the reaction product and the monoalcohol on the process 2) is a common urethanation reaction and can be conducted, like the usual urethanation reaction, at a temperature from room temperature to about 100° C. in the absence of a catalyst or in the presence of a tin or amine catalyst.

The resulting polyisocyanate is a liquid with a viscosity at 25° C. of about 20 poises or less and preferably about 15 poises or less and can be used as it is, i.e. without dilution with a solvent, in many industrial applications such as coatings, adhesives, etc. If necessary, it can be used as dissolved in low-toxic nonpolar solvents.

Among such nonpolar solvents are low-toxicity low-dissolving nonpolar organic solvents inclusive of aliphatic or naphthenic hydrocarbon solvents having aniline points between about 10° and 70° C., preferably between about 12° and 65° C. as well as terpene oil and other vegetable oils.

As representative species of said nonpolar organic solvents are petroleum-based hydrocarbon organic solvents such as Haus (Shell Chemical, aniline point 15° C.), Swasol 310 (Maruzen Oil, aniline point 16° C.), Esso Naphtha No. 6 (Exxon Chemical, aniline point 43° C.), Lous (Shell Chemical, aniline point 43° C.), Esso Naphtha No. 5 (Exxon, aniline point 55° C.), Pegassol 3040 (Mobile Oil, aniline point 55° C.) and so on. In addition, methylcyclohexane (aniline point 40° C.), ethylcyclohexane (aniline point 44° C.) and terpene oils such as gum terpene N (Yasuhara Oils and Fats, aniline point 27° C.) can be mentioned.

The polyisocyanate of the present invention can be mixed with such non-polar petroleum-based hydrocarbon organic solvents in optional ratios and does not produce white turbidity even at a low temperature of about 5° to 0° C.

While the polyisocyanate of the present invention can be used in combination with various polyols, in the main, for the preparation of coatings, adhesives, architectural materials, molding materials, etc., the preferred kinds of polyols are polyols containing two or more hydroxyl groups per molecule, such as alkyd polyols, acrylic polyols, acrylated alkyd polyols, polyether polyols, polyester polyols, polybutadiene oligomers, fluorine-containing polyols, Si-containing polyols and so on. When a nonpolar solvent is used as a diluent, a polyol which is either soluble therein, has a certain degree of affinity for it or is dispersible is employed. Thus, alkyd polyols with an oil length of more than 40% or alkyd polyols containing a material having a high affinity for nonpolar organic solvents such as p-tert-butylbenzoic acid, acrylic polyols derived from materials having a high affinity for nonpolar organic solvents such as isobutyl methacrylate, 2-ethylhexyl methacrylate and preferably acrylic polyols containing at least 10% of an alkyd component can be mentioned.

Because of its low viscosity, the polyisocyanate of the present invention contributes to reduced solvent requirements and permits the use of low-toxicity nonpolar solvents so that it helps improve the working environment and solve the pollution problem to a remarkable extent. Moreover, it is much instrumental in realizing improvements in performance.

When this polyisocyanate is used in combination with a polyol, the main component, to form a coating film, the physical properties, such as impact resistance and flexural strength, etc., of the film are improved and this effect is particularly pronounced when a fast-drying hydroxyl component represented by an acrylic polyol is employed. Furthermore, when a nonpolar solvent is used as a diluent for topping or repairing the original coat vulnerable to polar solvents, a coating composition consisting of the polyisocyanate of the invention and said polyol having a high affinity for nonpolar solvents provides a smooth and commercially very satisfactory cured film without a lifting (shrinking) defect.

Furthermore, even when used as a curing component in the production of fluorine-containing resins or Si-containing resins, the polyisocyanate shows excellent compatibility and does not present problems such as turbidity.

The following working and comparative examples are further illustrative of the present invention. It is to be understood that all percents (%) are by weight unless otherwise indicated.

EXAMPLE 1

An $N_2$-purged one-liter, four-necked glass flask fitted with a stirrer, thermometer, nitrogen gas inlet pipe and reflux condenser was charged with 500 g of 1,6-hexamethylene diisocyanate (hereinafter referred to briefly as HDI) and 5 g of 5-ethyl-2-nonanol and the charge was heated at a constant temperature of 80° C. in a nitrogen gas atmosphere for 2 hours to give a homogeneous solution. The temperature was then reduced to 50° C. and as an isocyanuration catalyst, 0.1 g of trimethyl-N-2-hydroxypropylammonium 2-ethylhexanoate was added, followed by addition of 0.25 g of tetraphenyl dipropylene glycol diphosphite. The mixture was then heated at an increased temperature of 60° C. for 3 hours. The reaction was then terminated by adding 0.05 g of benzoyl chloride as a catalyst killer. Thereafter, the reaction mixture was subjected to film evaporation (degree of vacuum 0.7 mmHg, temperature 150° C.) to remove the unreacted HDI monomer. The procedure gave 92.4 g (conversion rate 18.3%) of a clear, pale yellow product.

This polyisocyanate had a Gardner color scale number of not more than 1, a Gardner viscosity at 25° C. of T to U and an NCO content of 22.6%. This polyisocyanate could be diluted with Swasol 310, a nonpolar solvent, to a concentration of 75% and remained to be a clear homogeneous liquid without showing turbidity even at 5° C. When a two-package urethane coating system was prepared using Retan PG-80 (White enamel, Kansai Paint Co., Ltd.), an automotive repair coating, and the polyisocyanate of the present invention (equimolar system) and the film performance of the system was evaluated, the results were superior to controls, particularly in terms of flexibility, as shown in Table 1. Table 2 shows the compatibility data generated by preparing a two-package urethane system using Lumiflon LF-600 (a fluororesin, nonvolatile matter 50%, OH value 31, Asahi Glass Co.) and the polyisocyanate of the invention. It is apparent from Table 2 that both the solution and the film were homogeneous and clear, indicating improved compatibility over controls.

EXAMPLE 2

The reaction described in Example 1 was repeated excepted that n-decanol was used as the alcohol and the unreacted isocyanate monomer was removed to give 94.4 g (conversion rate 18.7%) of a clear, pale yellow product.

This polyisocyanate had a Gardner color number of not more than 1, a Gardner viscosity of U to V and an NCO content of 22.7%. This polyisocyanate could be diluted with Swasol 310, a nonpolar solvent, to a concentration of 75%. The film obtained by using this polyisocyanate in combination with Retan PG-80 was highly flexible (Table 1) and the resin varnish prepared with Lumiflon LF-600 was homogeneous and clear in solution form and as a cured film, indicating excellent compatibility (Table 2).

EXAMPLE 3

The reaction described in Example 1 was repeated except that 2-hexyldecanol, a branched higher alcohol, was used as the alcohol and the unreacted HDI monomer was removed to give 96.5 g (conversion rate 19.1%) of a clear, pale yellow product.

This polyisocyanate had a Gardner color number of not more than 1, a viscosity of U to V and an NCO content of 22.5%. This polyisocyanate could be dissolved not only in Swasol 310, a nonpolar solvent, but also in terpene oil (Gum Terepene N), which is still less polar, to a concentration of 75%, giving a clear homogeneous liquid without showing turbidity even at 5° C. Using this polyisocyanate in combination with an acrylic polyol based on tert-butyl methacrylate and having a nonvolatile content of 50.1%, a Gardner color number of not more than 1, a Gardner viscosity of S to W, an acid value of 3.0 and a hydroxyl value of 30 (solvent: Swasol 310) in equimolar proportions, a resin varnish was prepared and tested. This varnish provided a satisfactory cured film as shown in Table 3. The resin varnish prepared using Lumiflon LF-600 was excellent in compatibility just as was the corresponding varnish of Example 1 (Table 2).

EXAMPLE 4

An $N_2$-purged 5-liter, four-necked glass flask fitted with a stirrer, thermometer, nitrogen gas inlet pipe and reflux condenser was charged with 5,000 g of HDI, followed by addition of 1.0 g of trimethyl-N-2-hydroxypropylammonium 2-ethylhexanoate, as an isocyanuration catalyst, and 2.5 g of tetraphenyl dipropylene glycol diphosphite. The system was heated at 60° C. for 4 hours, at the end of which time 0.5 g of benzoyl chloride was added to terminate the reaction. This reaction mixture was subjected to film evaporation for removal of unreacted HDI monomer to give 1025.1 g (conversion rate 20.5%) of a clear, fluid substance. This polyisocyanate (P1) had a Gardner color number of not more than 1, a viscosity of X to Y and an NCO content of 23.3%.

In a nitrogen gas atmosphere, 100 g of the above polyisocyanate (P1) was reacted with 4 g of n-decanol at 80° C. for 4 hours to give a clear, pale yellow product which was fluid at room temperature. This polyisocyanate had a Gardner color number of not more than 1, a viscosity of X to Y and an NCO content of 21.3%. This polyisocyanate could be diluted with Swasol 310, a nonpolar solvent, to a concentration of 75%. The coating system prepared using this polyisocyanate in combination with Retan PG-80 gave a highly flexible film (Table 1) and the resin varnish prepared using Lumiflon LF-600 in combination was homogeneous and clear as the solution and as a cured film, indicating good compatibility (Table 2).

EXAMPLE 5

In the same manner as described in Example 4, 100 g of the polyisocyanate (P1) prepared in Example 4 was reacted with 5 g of 2-octyldodecanol, a branched higher alcohol, to give a clear, pale yellow product which was fluid at room temperature. This polyisocyanate had a Gardner color number of not more than 1, a Gardner viscosity of X to Y and an isocyanate content of 21.5%. This polyisocyanate could be dissolved not only in Swasol 310 but also in a less polar terpene oil (Gum Terpene N) to a concentration of 75% and gave a homogeneous, clear liquid without turbidity even at 5° C. The resin varnish prepared by using this polyisocyanate in combination with the same acrylic polyol as used in Example 3 yielded a satisfactory cured film (Table 3) and the resin varnish prepared using Lumiflon LF-600 in combination was clear and homogeneous in the solution form and as well as in the form of a cured film, indicating excellent compatibility (Table 2).

EXAMPLE 6

In the same manner as described in Example 4, 50 g of the polyisocyanate prepared in Example 1 was reacted with 2 g of 2-octyldodecanol, a branched higher alcohol, to give a clear, pale yellow product which was fluid at room temperature. This polyisocyanate had a Gardner color number of not more than 1, a Gardner viscosity of U to V and an NCO content of 21.2%. The polyisocyanate could be dissolved not only in Swasol 310 but also in a less polar terpene oil (Gum Terpene N) to a concentration of 75% and the solution was a clear, homogeneous liquid without turbidity even at 5° C. The resin varnish prepared by using this polyisocyanate in combination with the same acrylic polyol as used in Example 3 yielded a satisfactory cured film (Table 3) and the resin varnish prepared using Lumiflon LF-600 in combination was clear and homogenous in the solution form as well as in the form of a cured film, indicating to excellent compatibility (Table 2).

EXAMPLE 7

The reaction of Example 3 was repeated except that 350 g of HDI and 150 g of 1,3-bis(isocyanatomethyl)-cyclohexane (H₆XDI) were used as the isocyanate monomer component and the unreacted monomer component was removed to give 99.5 g (conversion rate 19.7%) of a clear, pale yellow product.

This polyisocyanate had a Gardner color number of not more than 1, a Gardner viscosity of Y to Z and an NCO content of 22.0%. The polyisocyanate could be dissolved not only in Swasol 310 but also in Gum Terpene N to a concentration of 75%, giving a clear, homogeneous liquid which showed no turbidity even at 5° C. The resin varnish prepared in combination with the same acrylic polyol as used in Example 3 gave a satisfactory cured film and the resin varnish using Lumiflon LF-600 was clear and homogeneous in the solution form as well as in the form of a cured film, indicating excellent compatibility (Table 2).

EXAMPLE 8

The reaction of Example 3 was repeated except that 475 g of HDI and 25 g of 1,3-xylylene diisocyanate (XDI) were used as the isocyanate monomer component and the unreacted monomer component was removed to give 96.0 g (conversion rate 19.0%) of a clear, pale yellow product.

This polyisocyanate had a Gardner color number of not more than 1, a Gardner viscosity of X to Y and an NCO content of 22.3%. It could be dissolved in Swasol 310 and Gum Terpene N to a concentration of 75% and the solution was a clear, homogeneous liquid without showing turbidity even at 5° C. The resin varnish prepared using this polyisocyanate in combination with the acrylic polyol as used in Example 3 yielded a satisfactory cured film and the resin varnish prepared using Lumiflon LF-600 was clear and homogeneous in the solution form and as well as in the form of a cured film, indicating excellent compatibility (Table 2).

COMPARATIVE EXAMPLE 1

An N₂-purged one-liter, four-necked flask fitted with a stirrer, thermometer, nitrogen gas inlet pipe and reflux condenser was charged with 500 g of HDI, followed by addition of 0.1 g of trimethyl-N-2-hydroxypropylammonium 2-ethylhexanoate as an isocyanuration catalyst and, then, 0.25 g of tetraphenyl dipropylene glycol diphosphite. The mixture was heated at 60° C. in a nitrogen as atmosphere for 4 hours, at the end of which time 0.05 g of benzoyl chloride was added as a catalyst killer to terminate the reaction. The reaction mixture was then subjected to film evaporation to remove the unreacted HDI monomer, whereby 105.0 g (conversion rate 21.0%) of a clear liquid was obtained. This polyisocyanate had a Gardner color number of not more than 1, a Gardner viscosity of X to Y, and an NCO content of 22.9%. This polyisocyanate could not be dissolved to a concentration of 75%, even at room temperature, in any of Swasol 310 and terpene oil. Thus, when diluted with these solvents, the polyisocyanate showed white turbidity and the dilutions separated into two layers on overnight standing. The properties of a cured film obtained from a two-package urethane system consisting of this polyisocyanate and Reta PG-80 are shown in Table 1. It is apparent that this film is inferior to the films of the examples in regard of flexibility. The urethane varnish prepared in combination with Lumiflon LF-600 as homogeneous in the solution form but its cured film was not clear, indicating poor compatibility (Table 2).

COMPARATIVE EXAMPLE 2

The reaction of Example 1 was repeated except that 1,3-butanediol was used in lieu of 5-ethyl-2-nonal and the unreaced HDI monomer component was distilled off to give 101.5 g (conversion rate 20.3%) of a clear pale yellow product.

This polyisocyanate had a Gardner color number of not more than 1, a Gardner viscosity of Y to Z and an NCO content of 22.2%. Like the polyisocyanate of Comparative Example 1, this polyisocyanate as not soluble in nonpolar solvents and the dilutions separated into two layers on standing. The properties of cured film from the two-package system with Retan PG-80 and the compatibility of this polyisocyanate with Lumiflon LF-600 were also unsatisfactory.

COMPARATIVE EXAMPLE 3

In the same manner as described in Example 4, 100 g of the polyisocyanate (P1) preared in Example 4 was reacted with 5 g of 12-hydroxystearyl alcohol to give a clear pale yellow product which was fluid at room temperature. This polyisocyanate had a Gardner color number of not more than 1, a Gardner viscosity of Y to Z and an NCO content of 21.4%. This compound could not be dissolved in Swasol 310 or terpene oil to a concentration of 75% but the dilutions showed white turbidity and separated into two layers on overnight standing.

COMPARATIVE EXAMPLE 4

In the same manner as described in Example 4, 100 g of the polyisocyanate (P1) prepared in Example 4 was reacted with hydrogenated castor oil (12-hydroxystearic acid glycerol ester, OH value 160) to give a clear pale yellow product which was fluid at room temperature. This polyisocyanate had a Gardner color number of not more than 1, a Gardner viscosity of Z to $Z_1$ and an NCO content of 21.6%. This compound could not be dissolved in Swasol 310 or terpene oil to a concentration of 75% and the dilutions showed white turbidity and separated into two layers on overnight standing.

TABLE 1

|  | Example | | | Comparative Example | |
|---|---|---|---|---|---|
|  | 1 | 2 | 4 | 1 | 2 |
| Pencil hardness | 2H | 2H | 2H | 2H | 2H |
| Erichsen test [6 mm] | o | o | o | Δ | x |
| Cross-cut test | 100 | 100 | 100 | 100 | 100 |
| Impact test* | o | o | o | Δ | Δ |
| Flexural test [2 mm] | o | o | o | Δ | x |

(Film thickness 40 ± 5μ)
*½ Φ, 0.5 kg, 50 cm

TABLE 2

|  | Example | | | | | | | | Comparative Example | | | |
|---|---|---|---|---|---|---|---|---|---|---|---|---|
|  | 1 | 2 | 3 | 4 | 5 | 6 | 7 | 8 | 1 | 2 | 3 | 4 |
| Solution | o | o | o | o | o | o | o | o | o | o | o | o |
| Film* | o | o | o | o | o | o | o | o | Δ | x | x | x |

(film thickness 40 ± 5μ)
*Set to touch

TABLE 3

|  | Example | | | Comparative Example | |
|---|---|---|---|---|---|
|  | 3 | 5 | 6 | 3 | 4 |
| Pencil hardness | F | F | F | F | F |
| Erichsen test [8 mm] | o | o | o | o | o |
| Cross-cut test | 100 | 100 | 100 | 100 | 100 |
| Impact test* | o | o | o | Δ | Δ |

TABLE 3-continued

|  | Example | | | Comparative Example | |
|---|---|---|---|---|---|
|  | 3 | 5 | 6 | 3 | 4 |
| Flexural test [2 mm] | o | o | o | o | o |

*½ Φ, 1 kg, 30 cm
Note:
o: good
Δ: fear
x: poor

What is claimed is:

1. A polyisocyanate having an isocyanurate ring which can be diluted with a nonpolar solvent to a concentration of 75% or less and remains a clear homogeneous liquid without showing turbidity at 5° C. and which is obtained by reacting a diisocyanate compound selected from the group consisting of alkylene, cycloalkylene and aralkylene diisocyanates with a monoalcohol of 10- to 50 carbon atoms in the presence of an isocyanuration catalyst, and removing the unreacted diisocyanate compound from the reaction mixture.

2. The polyisocyanate as claimed in claim 1, wherein the diisocyanate compound is an alkylene diisocyanate.

3. The polyisocyanate as claimed in claim 2, wherein the alkylene diisocyanate is 1,6-hexamethylene diisocyanate.

4. The polyisocyanate as claimed in claim 1, wherein the diisocyanate compound is a cycloalkylene diisocyanate.

5. The polyisocyanate as claimed in claim 4, wherein the cycloalkylene diisocycanate is 1,3-bis(isocyanato methyl)cyclohexane.

6. The polyisocyanate as claimed in claim 1, wherein the monoalcohol is a branched monoalcohol of 12 to 30 carbon atoms.

7. The polyisocyanate as claimed in claim 1, wherein the monoalcohol of 10 to 50 carbon atoms is n-decanol.

8. The polyisocyanate as claimed in claim 1, wherein the monoalcohol of 10 to 50 carbon atoms is 5-ethyl-2-nonanol.

9. The polyisocyanate as claimed in claim 1, wherein the monoalcohol of 10 to 50 carbon atoms is 2-hexyldecanol.

10. The polyisocyanate as claimed in claim 1, wherein the monoalcohol of 10 to 50 carbon atoms is 2-octyldodecanol.

11. The polyisocyanate as claimed in claim 1, wherein the monoalcohol is used in the amount of about 0.1 to 30 percent by weight based on the amount of the diisocyanate compound.

12. The polyisocyanate as claimed in claim 1, wherein the monoalcohol is used in the amount of about 0.5 to 20 percent by weight based on the amount of the diisocyanate compound.

13. The polyisocyanate as claimed in claim 1, wherein the isocyanuration catalyst is a hydroxyalkyl quaternary ammonium compound of the zwitterion type.

14. The polyisocyanate as claimed in claim 1, wherein the isocyanuration catalyst is trimethyl-N-2-hydroxypropylammonium 2-ethylhexanoate.

15. The polyisocyanate as claimed in claim 1, wherein the isocyanuration catalyst is used in the amount of about 0.001 to 0.1 percent by weight based on the amount of the diisocyanate compound.

16. The polyisocyanate as claimed in claim 1, wherein the isocyanuration catalyst is used in the amount of about 0.002 to 0.05 percent by weight based on the amount of the diisocyanate compound.

17. A process for producing a polyisocyanate having an isocyanurate ring which can be diluted with a nonpolar solvent to a concentration of 75% or less and remains a clear homogeneous liquid without showing turbidity at 5° C. and which is obtained by reacting a diisocyanate compound selected from the group consisting of alkylene, cycloalkylene and aralkylene diisocyanates with a monoalcohol of 10 to 50 carbon atoms in the presence of an isocyanuration catalyst, and removing the unreacted diisocyanate compound from the reaction mixture.

18. A process for producing a polyisocyanate having an isocyanurate ring which can be diluted with a nonpolar solvent to a concentration of 75% or less and remains a clear homogeneous liquid without showing turbidity at 5° C. and which comprises reacting a diisocyanate compound selected from the group consisting of alkylene, cycloalkylene and aralkylene diisocyanates with a monoalcohol of 10 to 50 carbon atoms in the presence of an isocyanuration catalyst, followed by removing the unreacted diisocyanate compound from the reaction mixture.

19. A process for producing a polyisocyanate having an isocyanurate ring which can be diluted with a nonpolar solvent to a concentration of 75% or less and remains a clear homogeneous liquid without showing turbidity at 5° C. and which comprises reacting a diisocyanate compound selected from the group consisting of alkylene, cycloalkylene and aralkylene diisocyanates in the presence of an isocyanuration catalyst, followed by removing the unreacted diisocyanate compound from the reaction mixture and reacting the reaction product with a monoalcohol of 10 to 50 carbon atoms.

20. The process for producing a polyisocyanate as claimed in claim 18, wherein the isocyanuration reaction is conducted at about 30° to 100° C.

21. The process for producing a polyisocyanate as claimed in claim 19, wherein the isocyanuration reaction is conducted at about 30° to 100° C.

22. The process for producing a polyisocyanate as claimed in claim 18, wherein the isocyanuration reaction is conducted at about 40° to 80° C.

23. The process for producing a polyisocyanate as claimed in claim 19, wherein the isocyanuration reaction is conducted at about 40° to 80° C.

24. The process for producing a polyisocyanate as claimed in claim 18, wherein the rate of conversion based on the combined charge of diisocyanate compound and monoalcohol is about 10 to 50 percent by weight.

25. The process for producing a polyisocyanate as claimed in claim 19, wherein the rate of conversion based on the combined charge of diisocyanate compound and monoalcohol is about 10 to 50 percent by weight.

26. The process for producing a polyisocyanate as claimed in claim 18, wherein the rate of conversion based on the combined charge of diisocyanate compound and monoalcohol is about 15 to 40 percent by weight.

27. The process for producing a polyisocyanate as claimed in claim 19, wherein the rate of conversion based on the combined charge of diisocyanate compound and monoalcohol is about 15 to 40 percent by weight.

* * * * *